(12) United States Patent
Xiong et al.

(10) Patent No.: US 7,519,080 B2
(45) Date of Patent: Apr. 14, 2009

(54) FIBRE CHANNEL FRAME-MODE GFP WITH DISTRIBUTED DELIMITER

(75) Inventors: Bing Xiong, Rohnert Park, CA (US); Fan Zhou, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 313 days.

(21) Appl. No.: 11/625,430

(22) Filed: Jan. 22, 2007

(65) Prior Publication Data

US 2007/0127526 A1 Jun. 7, 2007

Related U.S. Application Data

(62) Division of application No. 10/459,209, filed on Jun. 10, 2003, now Pat. No. 7,187,650.

(51) Int. Cl.
*H04J 3/16* (2006.01)

(52) U.S. Cl. .................. 370/466; 370/401; 370/389

(58) Field of Classification Search ................. 370/466, 370/235, 252, 392, 522, 539, 537, 401, 389, 370/404, 395.5, 907; 709/249, 246; 398/43, 398/45, 46
See application file for complete search history.

(56) References Cited

U.S. PATENT DOCUMENTS

| | | | |
|---|---|---|---|
| 5,610,745 A | 3/1997 | Bennett | |
| 5,638,518 A | 6/1997 | Malladi | |
| 5,668,857 A | 9/1997 | McHale | |
| 5,740,186 A | 4/1998 | Widner | |
| 5,941,972 A | 8/1999 | Hoese et al. | |
| 5,959,994 A | 9/1999 | Boggs et al. | |
| 6,338,131 B1 | 1/2002 | Dillon | |
| 6,393,489 B1 | 5/2002 | Sambamurthy et al. | |
| 6,400,730 B1 | 6/2002 | Latif et al. | |
| 6,636,529 B1 | 10/2003 | Goodman et al. | |
| 6,654,383 B2 | 11/2003 | Haymes et al. | |
| 2002/0083190 A1 | 6/2002 | Kamiya et al. | |
| 2002/0159484 A1 | 10/2002 | Azizoglu et al. | |
| 2002/0176450 A1 | 11/2002 | Kong et al. | |
| 2002/0196811 A1 | 12/2002 | Park et al. | |
| 2003/0074449 A1 | 4/2003 | Smith et al. | |
| 2003/0091037 A1 | 5/2003 | Latif et al. | |
| 2003/0112833 A1 | 6/2003 | Kamiya | |
| 2003/0185251 A1 | 10/2003 | Ichino et al. | |
| 2003/0218981 A1 | 11/2003 | Scholten | |
| 2004/0076175 A1 | 4/2004 | Patenaude | |
| 2004/0085902 A1 | 5/2004 | Miller et al. | |
| 2004/0085904 A1 | 5/2004 | Bordogna et al. | |
| 2004/0114924 A1 | 6/2004 | Holness et al. | |
| 2004/0202205 A1 | 10/2004 | Sheth | |

*Primary Examiner*—Ian N Moore
(74) *Attorney, Agent, or Firm*—Edell, Shapiro & Finnan, LLC

(57) ABSTRACT

A technique for providing multiple Fiber Channel frames in one frame-mapped GFP transport frame. GFP conventions are followed, except that a Distributed Delimiter marks each Fiber Channel frame in the payload of GFP transport frame. The Distributed Delimiter has a Fixed Pattern field which varies distinctly from the special K28.5 character which indicates Fiber Channel Ordered Sets and has a Frame Length field to indicate the length of the Fiber Channel frame.

11 Claims, 6 Drawing Sheets

FIBRE CHANNEL FRAME-MODE GFP WITH DISTRIBUTED DELIMITER

CROSS-REFERENCE TO RELATED APPLICATIONS

This application is a divisional of U.S. application Ser. No. 10/459,209 filed Jun. 10, 2003, now issued as U.S. Pat. No. 7,187,650 which is incorporated herein by reference in its entirety.

BACKGROUND OF THE INVENTION

The present invention relates to data networking and more particularly, to systems and methods for efficiently transporting Fibre Channel frames over a SONET/SDH transport network.

SONET/SDH and optical fiber have emerged as significant technologies for building large scale, high speed, Internet Protocol (IP) based networks. SONET, an acronym for Synchronous Optical Network, and SDH, an acronym for Synchronous Digital Hierarchy, are a set of related standards for synchronous data transmission over fiber optic networks. SONET/SDH is currently used in networks spanning large areas, such as metropolitan area networks (MAN) and even wide area networks (WAN). A SONET/SDH system consists of switches, multiplexers, and repeaters, all connected by fiber. The connection between a source and destination is called a path.

One network architecture for the high-speed interconnection of computer devices in network communication is Fibre Channel, the core standard of which is described in ANSI (American National Standards Institute) X3.230-1994. Arising out of data storage requirements, Fibre Channel currently provides for bi-directional gigabit-per-second transport over communication networks in Fibre Channel frames that consist of standardized sets of bits used to carry data over the network system. The high-speed Fibre Channel links are limited to no more than 10 kilometers.

It is advantageous to "combine" the SONET/SDH and Fibre Channel technologies, and new standards and protocols have emerged. For example, it is sometimes desirable to link two or more SANs (Storage Area Networks), which operate with Fibre Channel protocol, over a MAN (Metropolitan Area Network), or even a WAN (Wide Area Network), which typically operates under SONET or SDH standards. This extension of Fibre Channel from 100 kilometers to over several hundred, or even thousand, kilometers, is made by mapping Fibre Channel ports to a SONET/SDH path for transport across a SONET/SDH network.

Generic Framing Procedure (GFP) defines the mapping for the transport of higher level protocol client data over SONET/SDH networks. GFP specifically provides for transparent GFP (GFP-T) to encapsulate Fibre Channel (and certain other protocols, such as Gigabit Ethernet) client data frames into GFP-T frames and then to map the GFP-T frames into SONET/SDH frames for transport across the SONET/SDH network. As defined by the ITU-T G.7041 GFP standard, rather than storing an entire Fibre Channel frame, the individual characters, both data and control (including idle) characters, of the Fibre Channel frame are demapped from 8B/10B block code and then mapped into periodic, fixed length GFP frames. GFP-T has a resulting low transmission latency in accord with the high-speed nature of Fibre Channel. However, in exchange for low transmission latency (and hence high-speed transmission), GFP-T requires that the transport channel capacity be at least as large as the incoming data (and control signal) rate for the Fibre Channel characters to be encoded. Even in lightly loaded applications, GFP-T mapping transports the entire Fibre Channel physical link, including all of the interframe idles, and even adding padding characters into a GFP frame so that the frame can be transmitted quickly. Hence GFP-T requires full rate transport bandwidth.

This is a problem for telecommunication applications where long-distance connections are costly. A not uncommon telecommunication practice is to oversubscribe the transport link. For example, an OC48 pipe (a SONET/SDH link having a capacity of 2.488 Gigabits per second) might be used to handle four GE (Gigabit Ethernet) streams by taking advantage of statistical multiplexing, i.e., not all GE streams burst communication packets all the time. But GFP-T is not used because GFP-T is antagonistic toward oversubscription of the transport link. As explained above, GFP-T requires that the transport channel capacity should be at least as large as the incoming data and control signal rate, i.e., there can be no oversubscription of the SONET/SDH transport network.

GFP does provide for frame-mode GFP (GFP-F) transport in which the client data protocol units, i.e., frames, are adapted for transmission over the OTN (Optical Transport Network). For example, standard Ethernet, in contrast to Fibre Channel which is accommodated by the block-code oriented GFP-T, is provided for by GFP-F. If one tries to use Fibre Channel over GFP-F by following standard Ethernet over GFP-F procedures, one complete Fibre Channel frame or Ordered Set is mapped into one GFP frame. Since each GFP-F frame has a fixed overhead of 16 bytes, the overhead percentage is prohibitively high for smaller frames and Ordered Sets. In other words, Fibre Channel over conventional GFP-F is not effective for an oversubscribed SONET/SDH transport network.

Therefore, a way of providing for the transport of Fibre Channel frames across an oversubscribed OTN transport path, such as SONET/SDH, is highly desirable. To use bandwidth efficiently, multiple Fibre Channel Ordered Sets and frames should be capable of being mixed in one GFP payload area.

DETAILED DESCRIPTION OF THE INVENTION

Figure 1:
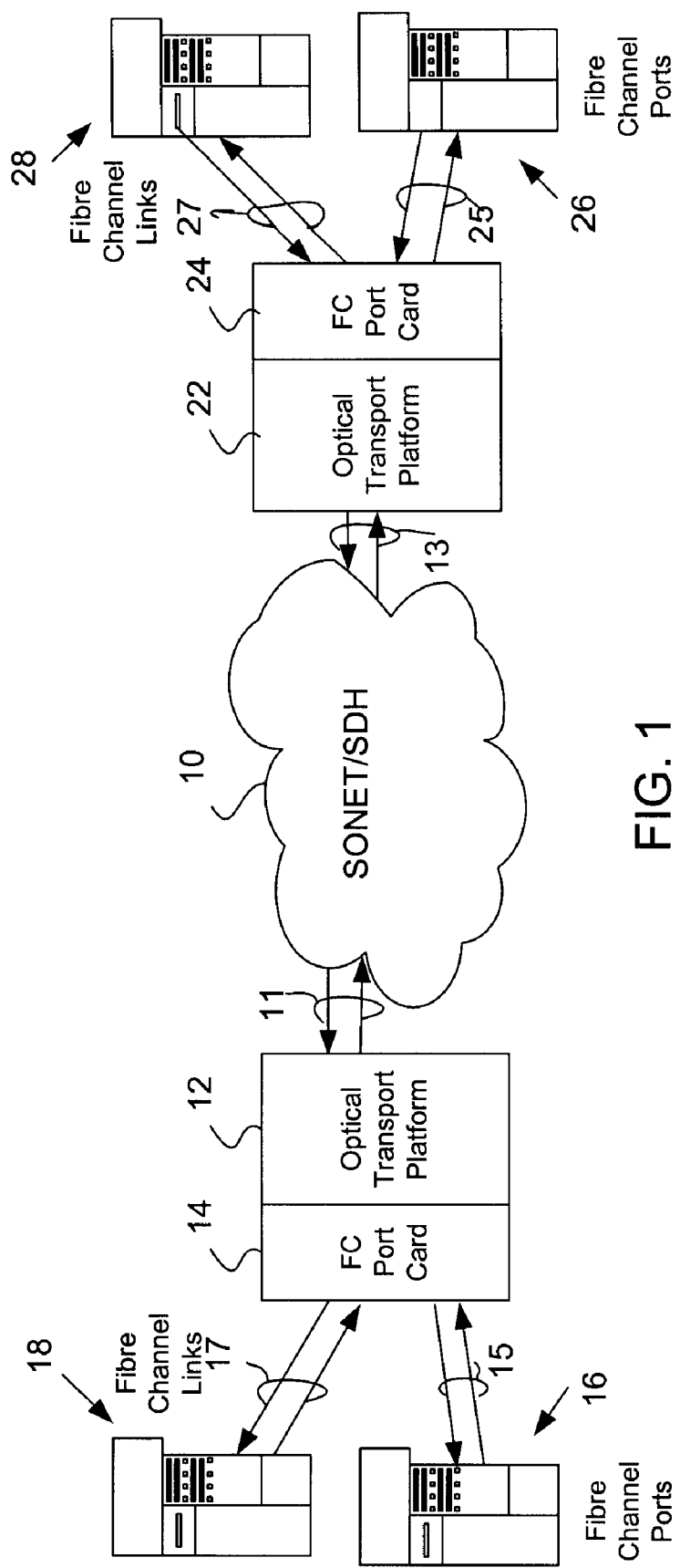
FIG. 1 depicts a representative network arrangement in which Fibre Channel frames are transported over a SONET/SDH network, in accordance with one embodiment of the present invention.

FIG. 1 illustrates a context for the present invention, an exemplary network with Fiber Channel over an OTN transport, such as a SONET/SDH network, by which Fibre Channel ports are connected over a SONET/SDH network 10. Fibre Channel ports 16 and 18 are connected by Fibre Channel links 15 and 17 respectively to a multi-port Fibre Channel card 14. Likewise, a second Fibre Channel port card 24 is connected by Fibre Channel links 25 and 27 to Fibre Channel ports 26 and 28 respectively. The Fibre Channel ports 16, 18, 26 and 28 are associated with elements which are interconnected by Fibre Channel. These elements include data storage elements, including disk drive arrays, RAIDs, disk farms, or possibly Fibre Channel network elements, such as routers, switches, or other Fibre Channel network elements. In FIG. 1 each Fibre Channel port card 14 and 24 is connected to a pair of Fibre Channel ports for purposes of illustration, and more ports may be connected to each Fibre Channel port card. The SONET/SDH network 10 provides a transport path to connect the Fibre Channel ports 16 and 18 with the Fibre Channel ports 26 and 28.

Optical transport platforms 12 and 22, such as ONS 15454 (available from Cisco Systems, Inc. of San Jose, Calif.), provide the interface between the Fibre Channel and SONET/SDH networks. The Fibre Channel ports 16 and 18 are connected to the multi-port Fibre Channel card 14 which is adapted to fit into the optical transport platform 12, and the Fibre Channel ports 26 and 28 are connected to the multi-port Fibre Channel card 24 which adapted to fit into the optical transport platform 22. Through the Fibre Channel port cards 14 and 24, which function as transport interfaces with the platforms 12 and 22 respectively, the Fibre Channel ports 16 and 18 are interconnected to the Fibre Channel ports 26 and 28 across the SONET/SDH network transport path with the result that there are two virtual wires for the connection between a representative Fibre Channel port at one end of the SONET/SDH network 10, say, port 18, and a representative Fibre Channel port at the other end, say, port 28. As explained above, GFP-T, transparent Generic Framing Procedure, is conventionally used as the framing protocol for such a network for encapsulating the Fibre Channel frames at one end of the SONET/SDH network 10 to be transmitted across the SONET/SDH network and for decapsulating the Fibre Channel data at the other end.

From the viewpoint of one virtual wire, say, from the Fibre Channel ports 16 and 18 toward the Fibre Channel ports 26 and 28, the data carrying capacity of the SONET/SDH link 11 should equal the combined capacity of the Fibre Channel links 15 and 17. There is a problem, however, if the capacity of the SONET/SDH link 11 is less than the capacity of the links 15 and 17, i.e., there is an oversubscription of the link 11. As described earlier, the conventional GFP-T transport cannot support such an oversubscription arrangement; nor can conventional GFP-F, for that matter.

Instead, the present invention uses specially adapted frame-mode GFP (GFP-F) for the transport of Fibre Channel frames from multiple Fibre Channel ports over an oversubscribed SONET/SDH or OTN transport path. With the special GFP-F of the present invention, the Fibre Channel interframe idles are also removed before GFP encapsulation and multiplexing at one end of the optical transport path, and inserted after GFP decapsulation and demultiplexing at the other end of the optical transport network, as is sometimes done in other transport instances, and is well-known to network designers. For example, when Ethernet is put on a long-distance transport link, the preamble is usually removed and not transported. Only Ethernet frames are transported through the long distance link. The removal of interframe idles from transport lessens the demand upon the capacity of the oversubscribed transport path. It should be noted that this removal of idle characters requires, in effect, that a Fibre Channel frame store and forward an identification of the frame's boundaries, a violation of the existing GFP-T standard.

The length of an Fibre Channel frame can range from 36 bytes to 2148 bytes. Besides data frames, Fibre Channel traffic contains many Ordered Sets, each with a length of 4 bytes, for controlling the transfer of data across a network. The transport device should be completely transparent to the Fibre Channel port. Therefore even in over-subscription, all traffic from the Fibre Channel port, except for idle characters, must be carried by the transport path.

Figure 2:
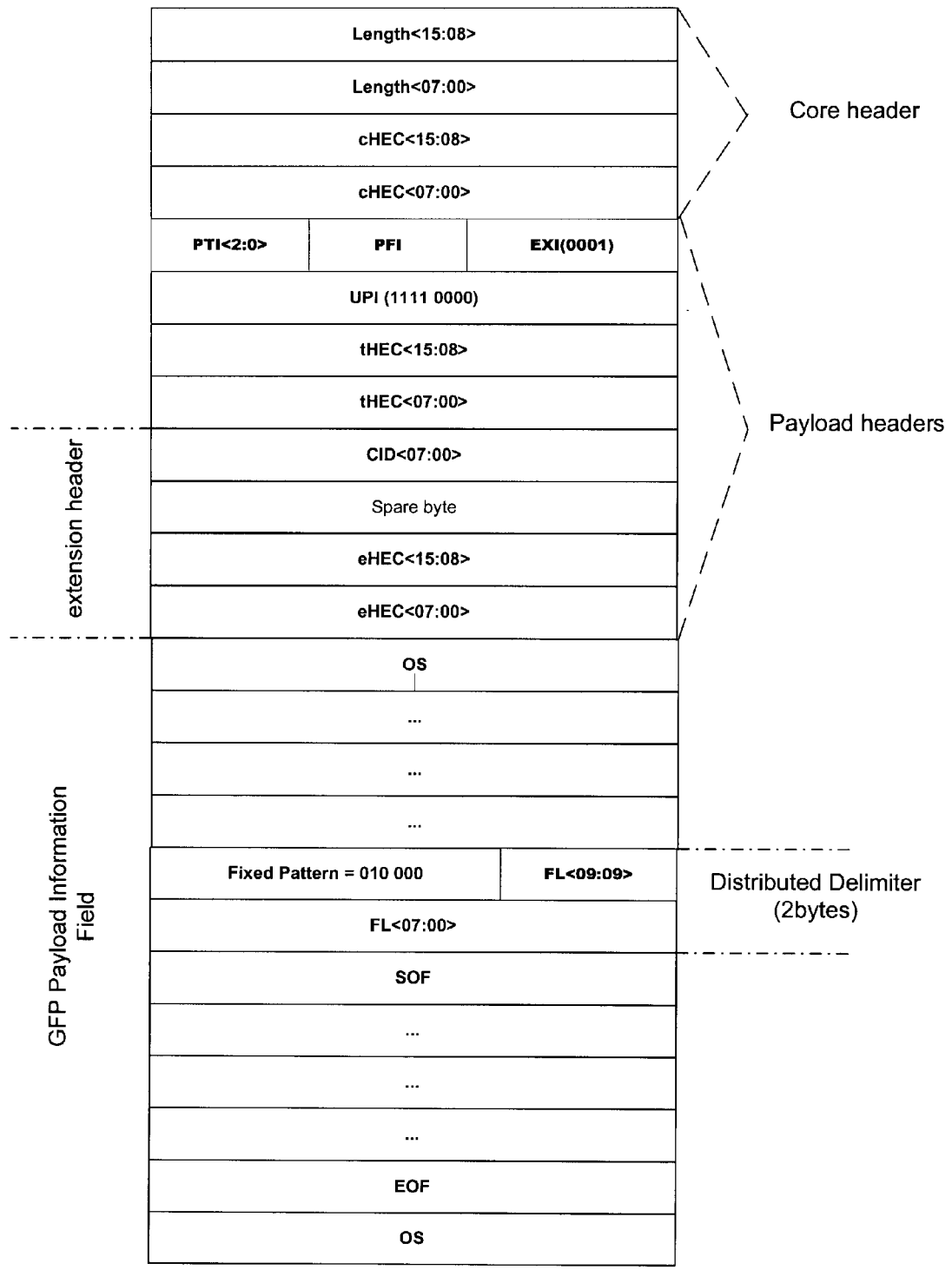
FIG. 2 depicts the format for GFP-F frames in accordance with one embodiment of the present invention.

To support these requirements, the present invention defines Fibre Channel Distributed Delimiter (DD) Frame-mapping GFP, as illustrated in FIG. 2. In accordance with the promulgated ITU-T G.7041 standard, the GFP frame is divided generally into a GFP Core Header and a GFP Payload Area. The Core Header has two fields, a 2-byte Payload Length Indicator field and a 2-byte Core Header Error Check (cHEC) field which protects the integrity of the Core Header.

The Payload Area is divided into a Payload Header and a Payload Information field. The Payload Header is composed of a 16-bit Type field and a 2-byte Type Header Error Check (tHEC) field which protects the integrity of the Type field. The Type field is composed of many different subfields: a 3-bit Payload Type Identifier (PTI) which identifies the type of GFP client frame, a 1-bit Payload FCS Indicator (PFI) field which indicates the presence or absence of a Payload FCS (Frame-Check Sequence) field; a 4-bit Extension Header Identifier (EXI) which identifies the type of Extension Header GFP, and a User Payload Identifier (UPI) which has 8 bits to identify the type of payload conveyed in the GFP Payload Information field. The UPI identification is relative to the type of GFP client frame indicated by the PTI subfield. Also part of the Payload Header is a payload Extension Header which generally supports technology (in this case, Fibre Channel) specific data link headers, such as virtual link identifiers, source/destination addresses, port numbers, Class of Service, extension header error control and so on. For the present invention, the type of extension header is indicated by the EXI bits, set as "0001" as shown in FIG. 2, to indicate a linear frame extension header which the G.1041 standard intends for cases where there are several independent links requiring aggregation onto a single transport path. The Extension Header for a linear frame extension header has: a Channel ID (CID) field of 8 bits to indicate one of 256 communication channels at a GFP termination point; an 8-bit spare field reserved for future use; and a 16-bit Extension Header Error Control field for the error control code to ensure the integrity of the payload Extension Header. More details and the functions of the fields in a GFP frame can be found in ITU-T G.7041

The G.7041 GFP specification consists of both common and client-specific aspects. As described thus far, the present invention utilizes the some of the common aspects of GFP. Where the present invention diverges from the common, and enters the client specific, aspects is seen in the UPI, User Payload Identifier, touched on above and a Distributed Delimiter which is explained in detail below.

UPI or User Payload Identifier

The 8-bit UPI, User Payload Identifier, is conventionally set according to the transported client signal type. When PTI (Payload Type Indicator) is "000" to indicate that client data are being transported, for example, UPI set at "0000 0001" means that the payload is frame-mapped Ethernet, UPI at "0000 0010" means that the payload is frame-mapped PPP (Point-to-Point Protocol), "0000 0011" means that the payload is transparent Fibre Channel and so on. On the other hand, the UPI values, "1111 0000" through "1111 1110," of UPI are reserved for proprietary use in G.7041. Likewise, when PTI (Payload Type Indicator) is "100" to indicate that a client management (i.e., control) frame, i.e., is being transported, UPI set at "0000 0001" means a loss of the client signal and UPI at "0000 0010" means that the loss of character synchronization. The UPI values, "0000 1100" through "1111 1110", of UPI are reserved for future use in G.7041.

In the present invention, the present invention uses one of these reserved values, specifically "1111 0000," to indicate that Fibre Channel data with Distributed Delimiter is in payload information field.

Distributed Delimiter

The Distributed Delimiter header, or DD, as indicated by its name, is spread through GFP Payload Information Field and is attached to each Fibre Channel frame which is being transported in the GFP Payload Information Field. The DDs delimit each Fibre Channel frame in the Payload Information Field and provides length information on the Fibre Channel frame. DD is two bytes long and is located immediately before each SOF (Start of Frame) Ordered Set which always prefaces each Fibre Channel frame by Fibre Channel protocol. Likewise, each Fibre Channel frame is always followed by an EOF (End of Frame) Ordered Set. The DD for GFP transportation according to the present invention, has two fields, a Fixed Pattern field and a Frame Length field, as illustrated in FIG. 2.

The Fixed Pattern field occupies the DD[15:10] bits. These 6 bits have the fixed value of "010 000", which is derived from flipping the most significant 6 bits of K28.5, the special command character which initiates the sequence of bytes of the Fibre Channel Ordered Sets (OS). For example, the SOF and EOF OSs each start with K28.5. DD[15:8] bits occupy the positions supposed to be that of a K28.5. By the flipped bit pattern, DD is easily recognized in the GFP-demapping process. Furthermore, vote-based comparison of these 6 bits can be conducted in the decapsulation process. If a bit error occurs on a K28.5 of the OS, it even can be corrected. This improves robustness when transmission bit errors are present.

The Fibre Channel Frame Length (FL) field occupies the DD[9:0] bits and represents the length of Fibre Channel frame which immediately follows the Distributed Delimiter. The length, including SOF and EOF, is in units of a word (32 bits).

The calculation of the frame lengths for the DD is given by the following pseudo-code which illustrates algorithms for DD_GFP encapsulation and decapsulation. The code represents only GFP Client Specific Aspects; the aspects which are common to all GFP encapsulation and decapsulation have been omitted. The pseudo-code is for purposes of illustration and is not compliant to any programming language nor represent any specific hardware implementation.

Fibre Channel DD GFP Encapsulation Algorithm

Input: Fibre Channel word (32-bits), represented by input_word[31:0].

Output: FC DD_GFP-F payload gfp_pld, which has variable length.

Constants Definition:

LEN_THD: threshold value of Fibre Channel F-GFP encapsulation payload length, programmable for user. Once this value is reached, encapsulation process for the current GFP-F frame should be finished as soon as possible.

1. Start a new FC DD_GFP-F Frame encapsulation, i.e., initialize variables:
   i=0; len_cnt=0; in_frame=false; reach_thd=false; sof_flag=false, eof_flag=false;

2. For each new incoming Fibre Channel word, input_word, compare against FC SOF and EOF Ordered Set.

3. If input_word is SOF, do following:
   in_frame=true;
   dd_ptr=i;
   len_cnt ++;
   gfp_pld[i+2]=input_word[31:24];
   gfp_pld[i+3]=input_word[23:16];
   gfp_pld[i+4]=input_word[15:8]
   gfp_pld[i+5]=input_word[7:0]
   i=+6

4. If input_word is EOF, do following:
   in_frame=false;
   len_cnt ++;
   gfp_pld[dd_ptr][7:2]=010 000;
   {gfp_pld[dd_ptr)[1:0], gfp_pld[dd_ptr+1]}=len_cnt;
   len_cnt=0;
   gfp_pld[i]=input_word[31:24];
   gfp_pld[i+1]=input_word[23:16];
   gfp_pld[i+2]=input_word[15:8];
   gfp_pld[i+3]=input_word[7:0];
   i=+4;

5. If both step 3 and 4 are not met and executed, i.e. input_word is neither SOF nor EOF, then do following:
   gfp_pld[i]=input_word[31:24];
   gfp_pld[i+1]=input_word[23:16];
   gfp_pld[i+2]=input_word[15:8];
   gfp_pld[i+3]=input_word[7:0];
   i=+4;
   if (in_frame==true) then {len_cnt=+1}; else {len_cnt holds the current value}

6. Determine if current FC DD_GFP-F Frame is finished.
   If (i>LEN_THD and in_frame==false), then current FC DD_GFP-F Frame encapsulation is finished, and ready for other process(out of coverage of this article). Go back to step 1 and start next FC DD_GFP-F Frame.
   Else, go back to step 2, continue current FC DD_GFP-F Frame encapsulation process by processing a new input_word.

End of encapsulation algorithm.

To start the encapsulation of the 32-bit Fibre Channel words into a distributed delimiter GFP frame, step 1 of the algorithm initializes the various counters, i and len_count, and flags, in_frame, reach_thd, sof_flag and eof_flag. The i counter is an index for the location or order of the bytes from the Fibre Channel word in the GFP frame payload, gfp_pld, and is used for comparison against LEN_THD, the threshold set for the GFP frame payload length, to avoid overfilling the GFP frame payload. The 10-bit len_count counter keeps a count of the number of Fibre Channel words being encapsulated from an Fibre Channel fame. The in_frame flag is set (true) when the incoming Fibre Channel word is part of an Fibre Channel frame. The reach_thd flag is set when the Fibre Channel word has reached the end of the GFP frame payload and the that GFP frame should be terminated as soon as possible. Similarly, when set, the sof_flag and eof_flag indicate that the Fibre Channel word is Start of Frame or End of Frame Ordered Set respectively.

In step 2, the incoming Fibre Channel word of 32-bits is determined whether it is an SOF (Start of Frame) Ordered Set, EOF (End of Frame) Ordered Set, or neither.

Step 3 handles the Fibre Channel word if the Fibre Channel word is an SOF Ordered Set. The in_frame flag is set to indicate the start of an Fibre Channel frame, the dd_ptr (distributed delimiter pointer) is set to the current value of the counter i and the len_cnt is incremented by one. After the four SOF Ordered Set bytes are encapsulated as GFP payload bytes, the i counter is incremented by six to account for the two bytes for the Distributed Delimiter (DD) header (Fixed Pattern and frame length), which will be inserted before the four SOF Ordered Set bytes and the four bytes of the SOF Ordered Set. The first gfp_pld byte starts starting at index i+2 to account for the first two DD header bytes which precede the SOF bytes. See FIG. 2.

Step 4 handles the Fibre Channel word if the Fibre Channel word is an EOF Ordered Set. The in_frame flag is set to false to indicate the end of the current Fibre Channel frame and the len_cnt counter is incremented by one to account for the EOF Ordered Set word. The dd_ptr (distributed delimiter pointer) loaded in step 3 provides the index location (just in front of the SOF Ordered Set bytes of the current Fibre Channel frame) of the first DD byte which has its six most significant bits set to the Fixed Pattern. The two least significant bits of the first DD byte and all of the second DD byte are loaded with the counter len_cnt value, the number of words encapsulated in the current Fibre Channel frame. Then len_cnt is reinitialized and the four bytes of the EOF Ordered Set are encapsulated and then the i counter is incremented by four to account for the encapsulated EOF Ordered Set.

If the Fibre Channel word is neither an SOF nor EOF Ordered Set, step 5 simply puts the Fibre Channel word, whether part of a Fibre Channel frame or an Ordered Set, into the four bytes of the GFP frame payload and increments the i counter by four. If the Fibre Channel word is part of a frame, then the len_cnt is incremented by one; if the Fibre Channel word is not part of a frame, e.g., it is an Ordered Set (not SOF nor EOF), then the len_cnt is not incremented.

To determine that the payload of the GFP frame is filled or complete, the value of the i counter is compared to LEN_THD. If the i is greater than LEN_THD and the in_frame flag is not set, i.e., the last Fibre Channel word encapsulated was not part of a Fibre Channel frame, the GFP-F frame is complete. If the two conditions are not met, than the encapsulating procedure returns to step 2 to encapsulate another input Fibre Channel word until the conditions above are met and the GFP frame is filled for transmission.

In a preferred embodiment of the present invention, the encapsulation operation is performed by the exemplary multi-port Fibre Channel port card 14 or 24 which receive incoming Fibre Channel words from their Fibre Channel ports 16 and 18, and 26 and 28, respectively. See FIG. 1. The complementary operation, that of decapsulation, is performed by the multi-port Fibre Channel port card 14 and 24 which receives the encapsulated Fibre Channel words across the SONET/SDH network 10.

The decapsulation algorithm is described in detail below.

Fibre Channel DD GFP Decapsulation Algorithm

Input:

DD_GFP payload byte stream, represented by gfp_pld[i]. gfp_pld[i] is byte(8-bit), and i from 0 to N, where N is the length of payload.

Output:

1. 32-bit Fibre Channel word, represented by output_word[31:0]

2. SOF Ordered Set indicative flag, represented by sof, indicates if current output_word[31:0] is SOF.

3. EOF Ordered Set indicative flag, represented by eof, indicates if current output_word[31:0] is EOF.

4. data/Ordered Set indication, represented by K_D_Flag, indicates if current output_word[31:0] is data or an OS.

Constants Definition:

FP: Fixed Pattern in Distributed Delimiter, 6 bits, "010 000."

1. Start a new FC DD_GFP-F Frame decapsulation, i.e., initialize some variables:
   i=0; len_cnt=0; in_frame=false; sof=false, eof=false;
2. For current incoming DD_GFP-F frame payload byte, gfp_pld[i],
   if current in_frame==false, then continue to step 3,
   if current in_frame==true, go to step 4.
3. When in_frame==false,
   determine if current gfp_pld[i] is DD by doing
   {
   temp[5:0]=gfp_pld[i][7:2] exclusive-or FP;
   sum=temp[5]+temp[4]+temp[3]+temp[2]+temp[1]+temp[0];
   if (sum<3) then
   {current gfp_pld[i] is the 1st byte of DD, DD[15:8], go to 3.1};
   if(sum>=3) then
   {current gfp_pld[i] is the 1st byte of an OS, K28.5, go to 3.2};
   }
   3.1 When gfp_pld[i] is DD[15:8], derive the output as following:
   {
   len_reg={gfp_pld[i][1:0], gfp_pld[i+1][7:0]};
   output_word={gfp_pld[i+2], gfp_pld[i+3], gfp_pld[i+4], gfp_pld[i+5]};
   sof=true;
   in_frame=true; //change to true
   len_cnt=1;
   i=+6;
   }
   3.2 When gfp_pld[i] is 1st byte of OS, derive the output as following:
   {
   sof=false;
   eof=false;
   k_d_flag=K;
   output_word={0xBC, gfp_pld[i+1], gfp_pld{i+2], gfp_pld[i+3]}; //By putting 0xBC(K28.5) as first byte of the output_word, we correct bit errors on K28.5.
   i=+4;
   }
   Step 3 is followed by step 5.
4. When in_frame==true, do following:
   output_word={gfp_pld[i], gfp_pld[i+1], gfp_pld[i+2], gfp_pld[i+3]};
   sof=false;
   i=+4;
   len_cnt=+1;
   if(len_cnt==len_reg), do {eof=true; k_d_flag=K; in_frame=false;};
   if(len_cnt <len_reg}, do {eof=false; k_d_flag=D;
   Then continue to step 5.
5. Determine if end of current GFP payload is reached.
   If gfp_pld[i] reached the end of GFP payload, then go back to step 1 to begin processing next GFP payload.
   Else, go to step 2 to process next byte.
   End of decapsulation algorithm.

To start the decapsulation of the payload bytes of the DD GFP-F frames back into 32-bit Fibre Channel words, step 1 of the algorithm initializes the various counters, i and len_count, and flags, in_frame, sof_flag and eof_flag. The i counter is an index for the location of the current byte in the GFP frame payload, gfp_pld. The len_cnt counter keeps a count of the number of Fibre Channel words decapsulated from a GFP-F frames payload. The in_frame flag is set (true) when the current GFP frame payload byte is part of an Fibre Channel frame. The sof_flag and eof_flag indicate that the Fibre Channel word is a Start of Frame or End of Frame Ordered Set respectively. The sof_flag, eof_flag, and k_d_flag are not used in any of the tests in the decapsulation algorithm, but are, however, used in the subsequent Fibre Channel native transmission encoding, in which same input, such as 0xBC (K28.5), is encoded into different 10-bit codes depending on whether the input is a data or the first byte of an Ordered Set. This is part of Fibre Channel standard protocol. The present invention has the capability to recover such information for Fibre Channel.

In step 2, the status of the in_frame flag determines how the current GFP frame payload byte, gfp_pld, is handled. If the in_frame flag is not set, i.e., the current GFP frame payload byte is not part of a Fibre Channel frame, the process moves to step 3. If the in_frame flag is set, i.e., the current GFP frame payload byte is part of a Fibre Channel frame, the process moves to step 4.

In step 3 the current GFP frame payload byte is tested whether it is the first byte of the DD header. This is done by EXCLUSIVE-Oring the first six bits of the GFP frame payload byte with the six-bit Fixed Pattern. If the result is less than 3 (yes, in all likelihood by quasi-majority voting). This manner of determining the DD header immunizes the decapsulation against possible corruption of the Fixed Pattern (or K28.5) bits to a certain extent. Then the process moves to step 3.1 by which the length of the Fibre Channel frame indicated in the DD header is placed in a 10-bit holding register, len_reg, and the next four bytes, i+2 to i+5, are decapsulated into the output Fibre Channel word. The SOF flag is set and the in_frame flag is set. The len_cnt counter is set to "1" to indicate that the first 32-bit word of the Fibre Channel output word has been decapsulated, i.e., assembled, and the i counter incremented by six to indicate that six bytes of the GFP frame payload, two bytes of the DD header and six bytes of the following SOF Ordered Set, have been processed. The process then moves to step 5.

On the other hand, if the result of step 3 is equal or more than 3 (the current GFP frame payload byte is unlikely to be the first byte of the DD header), then the process moves to step 3.2. In this step, since the GFP payload byte is the first byte of an Ordered Set, the SOF and EOF flags are set to false, and the Ordered Set/data flag is set to K, i.e., an Ordered Set. Then the next four bytes of the GFP payload (including the first byte), i to i+3, are decapsulated into the Fibre Channel output word. But for the first byte, the particular value, 0xBC, is inserted. The value "0xBC" is the K28.5 control character byte which leads all Ordered Sets in Fibre Channel protocol. The insertion corrects for any error bits introduced into that control character. Then the i counter is incremented by four and the process moves to step 5.

Step 4 handles the GFP payload bytes which have been determined to be part of a Fibre Channel frame by step 2. The Fibre Channel output word is loaded with the next four bytes of the GFP payload, i to i+3, and the i counter is incremented by four. The SOF flag is set to false, and the Fibre Channel word counter, len_cnt, is incremented by one. Then a test of whether the end of the current encapsulated Fibre Channel frame is reached by determining whether len_cnt equals len_reg or not. If so, the EOF flag is set to true, k_d_flag is set to true to indicate an Ordered Set, and the in_frame flag is set to false to indicate the end of the current Fibre Channel frame. If not, the EOF flag is set to false and k_d_flag is set to indicate data. The process moves to step 5.

Step 5 simply determines whether the end of the current GFP payload has been reached or not. If so, the process returns to step 1 to begin processing next GFP payload. If not, the process returns to step 2 to process the payload byte.

It should be noted that the Distributed Delimiter Frame-mode GFP (DD GFP-F) mechanism takes advantage of all the following characteristics of Fibre Channel: 1) traffic is word(4 bytes)-oriented; 2) all Ordered Sets (OS) begin with the special K28.5 character; and 3) the Fibre Channel data is enclosed by SOF and EOF Ordered Sets; anything outside these boundaries is an Ordered Set. It is easy and graceful for DD F-GFP of the present invention to handle mixed OSs and Fibre Channel frames in the same F-GFP frame.

Figure 3A:
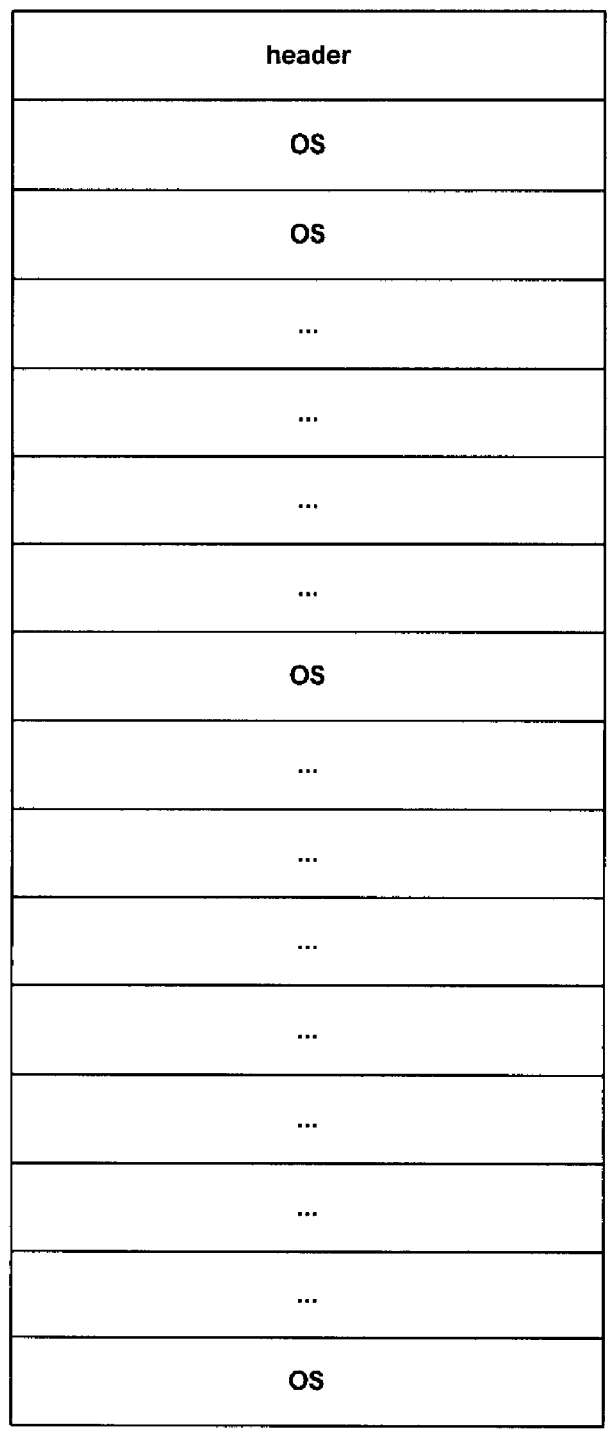
FIGS. 3A-3C depicts different mixtures of OSs and Fibre Channel frames in the same GFP-F frame in accordance with the present invention.
Figure 3B:
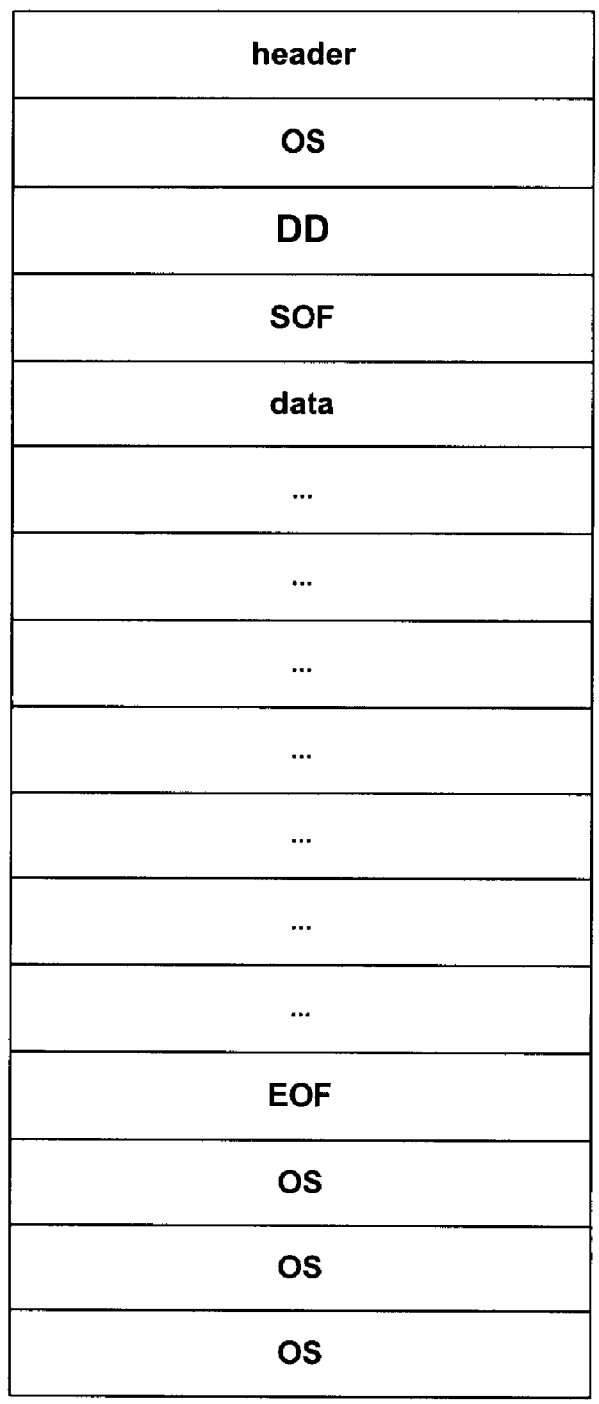
Figure 3C:
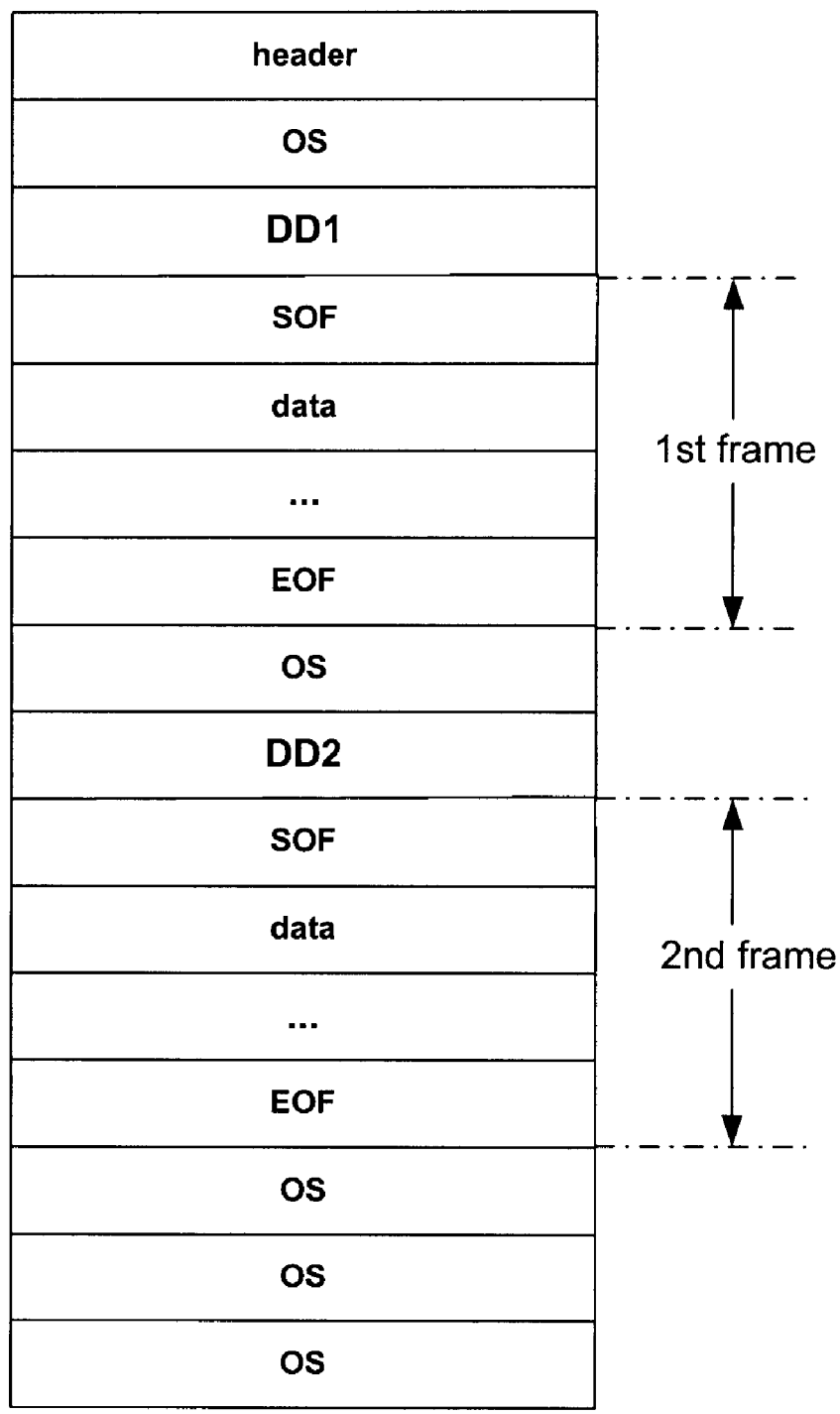

FIGS. 3A-3C illustrate different cases of Fibre Channel traffic in the payload of a GFP-F transport frame, in accordance with the present invention. FIG. 3A illustrates a GFP-F transport frame according to the present invention in which the GFP frame has no Fibre Channel frames; the payload of the GFP frame carries only Ordered Sets. In FIG. 3B, the exemplary GFP-F frame has one Fibre Channel frame in its payload. Note the Distributed Delimiter (DD) which marks the beginning of the Fibre Channel frame. In FIG. 3C multiple Fibre Channel frames, in this case, two, are carried in the GFP-F frame. Distributed Delimiters indicate each of the Fibre Channel frames.

Therefore, DD GFP-F achieves high bandwidth efficiency as required for an oversubscribed SONET/SDH link. The characteristics of Fibre Channel traffic are utilized so that multiple OSs and frames are mixed into one GFP payload with minimal overhead. Bandwidth efficiency can be demonstrated with the following calculation for a GFP frame. Referring to FIG. 2, it may be observed that a GFP header has 12 bytes; the Payload FCS (Frame-Check Sequence) field has 4 bytes; the Distributed Delimiter (DD) has 2*N bytes where N is number of Fibre Channel frames in on DD GFP-F frame. The bandwidth efficiency (BWE) is defined by the amount of information, data and control, in the GFP frame divided by the sum of the amount of information and the overhead, or $$BWE=(N*Length+M*4)/(N*Length+M*4+12+4+2*N)$$

where Length is FC frame length, M is the number of OSs in the GFP frame. Assuming that the Fibre Channel frames have average length of 1000 bytes, for example, two frames and 25 OSs may be placed into one GFP frame and we obtain a BWE>99%. In comparison, the bandwidth efficiency of the standard GFP-T mapping for Fibre Channel is 94.8% and there is a upper limit of 95.5%.

Another advantage of the present invention is that the Distributed Delimiter is robustly encoded. Within a GFP frame, each Distributed Delimiter is located in the midst of a cluster of Ordered Sets. The SOF is an Ordered Set. Therefore, in the decapsulating process, a determination must be made as to the location of the DD within the OSs. The first byte of DD, in which 6-bit forms Fixed Pattern, is located where the special K28.5 character of an Ordered Set is supposed to be. In the decapsulation process then, only a decision between K28.5 and DD is required. With the DD Fixed Pattern field being the inversion of the six most significant bits of K28.5, the decapsulation process still can recover the K28.5 even with a 3-bit error in the most significant 6 bits of K28.5. Conversely, even a 2-bit error in DD Fixed Pattern field can be corrected by decapsulation process. The decapsulation algorithm above details the vote/recovery mechanism.

Figure 4:
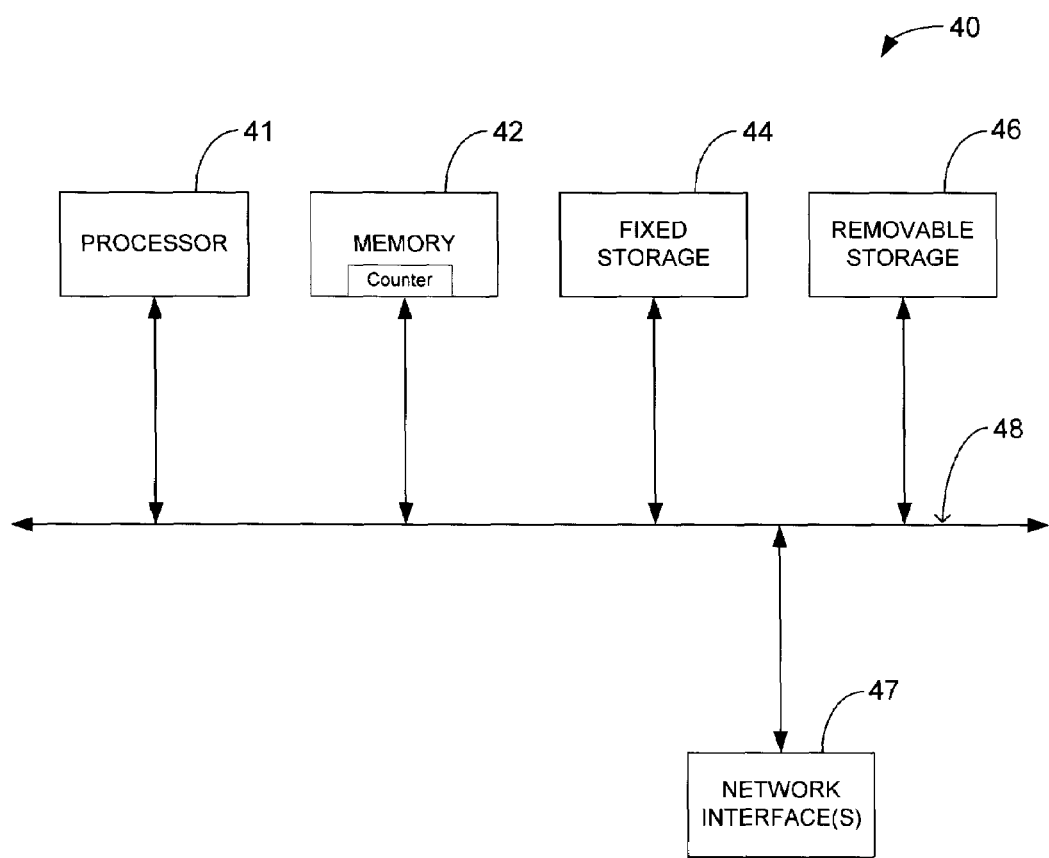
FIG. 4 is a representative of a block diagram of a general computer architecture which implements one aspect of the present invention.

The present invention might be best implemented in the Fibre Channel port cards 14 and 24 in the exemplary network of FIG. 1. The DD GFP-F algorithms of the present invention engine described above requires a 12-bit counter for the i counter and some simple logic. This contrasts with the complex logic required to handle the 64B/65B block codes in transparent GFP for Fibre Channel over SONET/SDH transport. With the DD GFP-F's reduced gate count and cost, hardware implementation in an ASIC (Application Specific Integrated Circuit) or an FPGA (Field Programmable Gate Array) is preferred. The result is a high-speed GFP encapsulation and decapsulation engine, which is highly desired particularly when applications require 10-gigabit per second or more throughputs of the GFP engine.

Where throughput is not necessarily paramount, the present invention might be implemented in firmware, such as the ROM (Read-Only Memory) of a microcontroller, or in software which offers certain advantages. For instance, the processor unit instructed by the software might also perform operations other than those described for DD GFP-F, or upgrades for the DD GFP-F algorithms can be made easily in software. FIG. 4 shows a block diagram of a representative computer system 40 that may be used to execute the software of an embodiment of the invention. The computer system 40 includes memory 42 which can store and retrieve software programs incorporating computer code that implements aspects of the invention, data for use with the invention, and the like. Exemplary computer readable storage media include CD-ROM, floppy disk, tape, flash memory, semiconductor system memory, and hard drive. The computer system 40 further includes subsystems such as a central processor 41, fixed storage 44 (e.g., hard drive), removable storage 46 (e.g., CD-ROM drive), and one or more network interfaces 47, all connected by a system bus 48. Other computer systems suitable for use with the invention may include additional or fewer subsystems. For example, computer system 40 may include more than one processor 41 (i.e., a multi-processor system) or a cache memory. The computer system 90 may also include a display, keyboard, and mouse (not shown) for use as a host.

Finally, the present invention offers easy compliance with ITU-T G.7041 standards As described above, Fibre Channel Distributed Delimiter Frame-mode GFP (DD GFP-F) of the present invention does not change any of the common aspects of GFP and only touches aspects of GFP which have been reserved for proprietary use. Stated differently, the client-specific aspects of Fibre Channel Distributed Delimiter Frame-mode GFP does not intrude into the defined parts of GFP.

Hence the present invention offers an improvement over conventional arrangements for Fibre Channel in which one telecommunication pipe (say, OC48) can be provisioned with 2 1xFC(full-rate Fibre Channel), 4 1xFC(half-rate Fibre Channel), or even 8 1xFC(¼ rate Fibre Channel) streams. The present invention allows the optical link to be oversubscribed so that the transport costs of the SONET/SDH network can be lowered for Fibre Channel frames.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

The invention claimed is:

1. A method of encapsulating a stream of Fibre Channel words into distributed delimiter frame-mode Generic Framing Procedure (GFP) frames, the method comprising:

ordering, by a transport interface, bytes of each Fibre Channel word in a payload for a distributed delimiter frame-mode GFP frame with a value from a first counter indicative of a current number of bytes in said distributed delimiter frame-mode GFP frame, including the substeps of:

determining whether a current Fibre Channel word is Start of Frame (SOF) Ordered Set, End of Frame (EOF) Ordered Set, or neither;

if said current Fibre Channel word is an SOF Ordered Set indicative of the beginning a Fibre Channel frame, adjusting said first counter by a predetermined amount to accommodate insertion of distributed delimiter header bytes into said frame-mode GFP frame payload before said SOF Ordered Set bytes of a Fibre Channel frame including counting the number of Fibre Channel words ordered in said distributed delimiter frame-mode GFP frame payload as of said current Fibre Channel word;

if said current Fibre Channel word is an EOF Ordered Set indicative of the end of a Fibre Channel frame, setting said distributed delimiter bytes to include a length of said Fibre Channel frame including counting the number of Fibre Channel words ordered in said distributed delimiter frame-mode GFP frame payload as of said current Fibre Channel word;

if said current Fibre Channel word is neither an SOF Ordered Set nor an LOF Ordered Set, totaling the number of Fibre Channel words in a Fibre Channel frame ordered in said distributed delimiter frame-mode GFP frame payload as of said current Fibre Channel word if said current Fibre Channel word is part of said Fibre Channel frame;

repeating said determining, adjusting and setting substeps until said first counter reaches a predetermined value and the current Fibre Channel word is not part of an Fibre Channel frame, then terminating said ordering step for said distributed delimiter frame-mode GFP frame payload.

2. The method of claim 1 wherein said setting substep comprises setting of fixed pattern of bits into said distributed delimiter bytes.

3. The method of claim 2 where said fixed pattern of bits comprises "010 000."

4. The method of claim 1 wherein said adjusting substep comprises:

setting a pointer with a current value from said first counter to provide for an order location of said distributed delimiter header bytes in said frame-mode GFP frame payload; and ordering bytes of said current Fibre Channel word with a first counter value adjusted for said distributed delimiter header bytes in said frame-mode GFP frame payload.

5. A method of decapsulating a stream of distributed delimiter frame-mode Generic Framing Procedure (GFP) frames encapsulating Fibre Channel words, the method comprising:

ordering, by a transport interface, bytes from a distributed delimiter frame-mode GFP frame payload into a Fibre Channel word with a first counter indicative of a current number of bytes in said distributed delimiter frame-mode GFP frame, including the substeps of:

determining whether a current byte is part of a Fibre Channel frame including comparing said current byte with a fixed pattern of bits indicative of said distributed delimiter header on a bit-by-bit basis and determining that said current byte is part of a distributed delimiter header when a predetermined number of bits of said current byte matches said fixed pattern of bits;

if said current byte is part of a Fibre Channel frame, ordering said current byte and subsequent bytes to form a Fibre Channel word and determining whether an end of said Fibre Channel frame is reached;

if said current byte is not part of a Fibre Channel frame, determining whether said current byte is part of a distributed delimiter header, including the subsubsteps of:

if so, loading a Fibre Channel frame length from said distributed delimiter header into a first register to set a length of said Fibre Channel frame, adjusting said first counter to reflect said distributed delimiter header, and ordering said current and subsequent bytes to form a Fibre Channel word;

if not, ordering said current and subsequent bytes to form a Fibre Channel word; and repeating said current byte determining, current byte ordering and distributed delimiter header determining substeps until an end of said distributed delimiter frame-mode GFP frame payload is reached, then terminating said ordering step for said distributed delimiter frame-mode GFP frame payload.

6. The method of claim 5 wherein said fixed pattern of bits comprises "010 000."

7. The method of claim 5 wherein said ordering subsubstep after determining that said current byte is not part of a distributed delimiter header, comprises:

substituting said current byte with special Fibre Channel command character K28.5 in said Fibre Channel word so that any first byte error in an Fibre Channel Ordered Set is corrected.

8. The method of claim 5 wherein in said ordering substep said end of said Fibre Channel frame is determined by comparing said first counter with said first register.

9. A method of encapsulating a stream of Fibre Channel words into distributed delimiter frame-mode Generic Framing Procedure (GFP) frames, the method comprising:

ordering, by a transport interface, bytes of each Fibre Channel word in a payload for a distributed delimiter frame-mode GFP frame with a value from a first counter indicative of the a current number of bytes in said distributed delimiter frame-mode GFP frame, including the substeps of:

determining whether a current Fibre Channel word is Start of Frame (SOF) Ordered Set, End of Frame (EOF) Ordered Set, or neither;

if said current Fibre Channel word is an SOF Ordered Set indicative of the beginning a Fibre Channel frame, adjusting said first counter by a predetermined amount to accommodate insertion of distributed delimiter header bytes into said frame-mode GFP frame payload before said SOF Ordered Set bytes of a Fibre Channel frame including setting a pointer with a current value from said first counter to provide for an order location of said distributed delimiter header bytes in said frame-mode GFP frame payload and ordering bytes of said current Fibre Channel word with a first counter value adjusted for said distributed delimiter header bytes in said frame-mode GFP frame payload;

if said current Fibre Channel word is an EOF Ordered Set indicative of the end of a Fibre Channel frame, setting said distributed delimiter bytes to include a length of said Fibre Channel frame;

repeating said determining, adjusting and setting substeps until said first counter reaches a predetermined value and the current Fibre Channel word is not part of an Fibre Channel frame, then terminating said ordering step for said distributed delimiter frame-mode GFP frame payload.

10. The method of claim 9 wherein said setting substep comprises setting of fixed pattern of bits into said distributed delimiter bytes.

11. The method of claim 10 where said fixed pattern of bits comprises "010 000."

* * * * *